United States Patent
Moore

[15] 3,683,143
[45] Aug. 8, 1972

[54] BATTERY CUTOFF SWITCH
[72] Inventor: Lloyd William Moore, 5653 White Fir Way Apt. #1, Sacramento, Calif. 95841
[22] Filed: Nov. 3, 1970
[21] Appl. No.: 880,008

[52] U.S. Cl. ..................200/162, 136/181, 200/161, 339/237
[51] Int. Cl. ..........................H01h 1/42, H01h 17/18
[58] Field of Search ......200/161, 162; 339/224, 237; 307/10, 10 AT; 136/181, 135 S

[56] References Cited
UNITED STATES PATENTS
3,166,650 1/1965 Heidrich................200/162 X
1,558,491 10/1925 Morfott................136/181 UX
2,458,930 1/1949 Crooke..................136/181 X
2,644,864 7/1953 Childs, Sr. .............200/162 X
1,615,106 1/1927 Bethea................200/161 UX
2,866,959 12/1958 Tecker..................339/237 X Primary Examiner—Robert K. Schaefer
Assistant Examiner—Robert A. Vanderhye

[57] ABSTRACT

A battery cutoff switch formed of tiered cylindrical insulators covered with tubes of conductive material and readily mountable upon a battery terminal. A knife blade is the movable contact.

5 Claims, 10 Drawing Figures

PATENTED AUG 8 1972　　　　　　　　　　　　　3,683,143
FIG. 1.　　　FIG. 2.　　　FIG. 3.
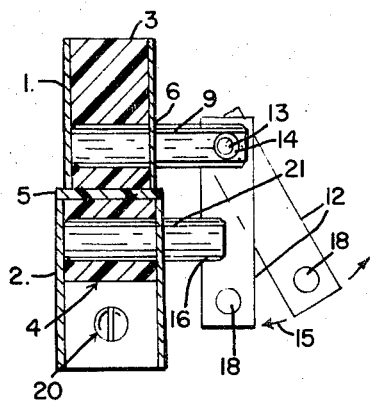
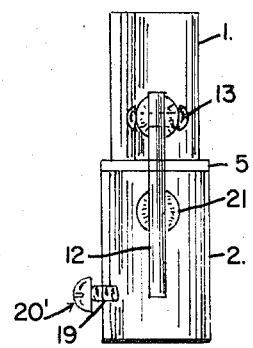
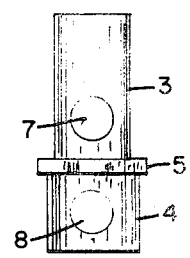
FIG. 4.　　　FIG. 5.　　FIG. 6.　　FIG. 7.
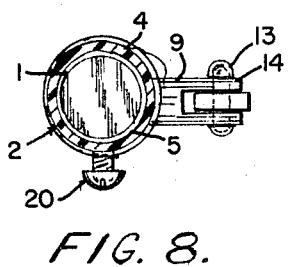
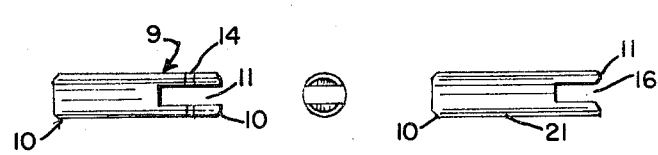
FIG. 8.　　　FIG. 9.　　FIG. 10.
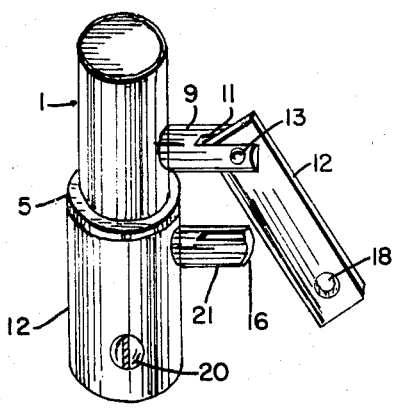
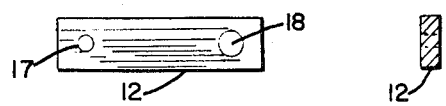
Lee Moore

BATTERY CUTOFF SWITCH

This invention is a specially designed electrical cut off, or Safety Switch, intended mostly for automobiles, and may be used for boats, tractors, trucks, or any vehicle, or engine, stationary or otherwise that utilizes a D.C. battery. This electrical Safety Switch can be easily and quickly attached over and on a D.C. battery post, preferably the negative pole, and secured there by a screw that screws through the lower part of the switch and presses against the D.C. battery post to hold the switch firmly in place. Then by taking the clamp on the end of the familiar ground or negative cable and placing it over and around the top part of the electrical Safety Switch rather than on the negative battery post itself as has been usual, the electrical Safety Switch can then act as an electrical cut off of power from the battery, simply by opening the bar on the switch itself, which disconnects the top from the bottom part of the switch. The plastic insulator in the electrical Safety Switch separates the top and bottom parts of the switch causing a break in the electrical flow. The bar on the side of the switch is the only means of electrical contact from the top to the bottom part of the switch. The intention of this electrical Safety Switch is to facilitate the operation of cutting off the power at its source, that is the battery, when so desired, rather than having to use a wrench or similar tool to disconnect the cable from the battery post. Examples as in the cases listed: (1) When the engine is left unattended. (2) When a malfunction or wire shorts, cause fire or damage to the starter, regulator, alternator, or battery. Or when an electrical malfunction causes constant horn blowing, or just to facilitate the job when working on the electrical system.

There is also a hole drilled in the lower part of the bar on the switch, to which a cable or remote control such as a choke cable, can be attached by one end. The other end of the cable with a plastic knob attached thereto can be let through the fire wall of an automobile and attached under the dashboard or in the glove compartment, thereby facilitating the ease of cutting off the power at the battery when so desired. This factor could be a deterrent to some extent to reduce the possibility of the theft of an automobile.

This cable is not included in the drawings.

The drawings include the following views of the Electrical Safety Switch:

FIG. 1. Is an detailed view of the complete electrical switch.
FIG. 2. Is a front elevation of the complete switch.
FIG. 3. Is an elevation of the plastic insulator.
FIG. 4. Is a plan of the complete electrical switch.
FIG. 5. Is a top view of the slotted 5/16 inch rod.
FIG. 6. Is an end view of the 5/16 inch slotted rod.
FIG. 7. Is a top view of the bottom 5/16 inch slotted rod.
FIG. 8. Is a perspective view of the complete switch.
FIG. 9. Is a plan view of the contact bar.
FIG. 10. Is an end view of the contact bar.

The Electrical Safety Switch FIG. 8. is comprised of two pieces of copper tubing of two different diameters. In FIG. 1. which is a detailed view of the Electrical Safety Switch, the top piece of copper tubing 1. is ⅝ inch O.D. by 1 inch long. The bottom piece of copper tubing 2 is of an inside diameter large enough to fit over the post of a D.C. battery and contacting snugly the bottom part of the post which is the top of the battery. This piece of copper tubing 2 is of a length 1-1/8 inch long. This length being long enough to be at least ½ inch longer than the extended part of the battery post itself. Into this top ½ inch of this bottom piece of copper tubing 2 is pressed a piece of H.D. Linear Polyethylene FIG. 3 -4. This piece of High Density Linear Polyethylene has been shaped also with a 1/16 inch lip on it 5 to which this bottom piece of copper tubing 2 comes in contact with and acts as a stop. This piece of H.D. Polyethylene FIG. 3 besides being pressed partially into the lower piece of copper tubing 2 it is also shaped with a smaller diameter at the top 3. The diameter being equivalent to the inside diameter of the top piece of copper 1 into which is pressed the top part of the plastic 3 and stopped at the top part of the lip 5 of the H.D. Polyethylene. The H.D. Polyethylene extending the complete length of the top piece of copper tubing 1 being flush at the top.

This piece of H.D. Polyethylene FIG. 3 now holds the two pieces, top 1 and bottom 2 of the copper tubing together separated only the the 1/16 inch plastic lip 5. This making one piece and forms the body of the Electrical Safety Switch.

Through one side of the top piece of copper tubing 1 and up 9/32 inch from the plastic lip 5 is drilled a 5/16 inch diameter hole 6 extending through the plastic 7 and stopping there.

On a center line from this hole 6 & 7 extending longitudinally down 9/32 inch from the bottom side of the plastic lip 5 is drilled a similar 5/16 inch diameter hole 8 through one side of the bottom piece of copper tubing 2 and through the plastic 8. Into the upper hole 6 & 7 is pressed a 5/16 inch diameter copper rod 9 which is 1-3/16 inch in length, and chamfered on both ends 10 and slotted 11 on one end to receive a ⅛ inch × ⅜ inch × 1-7/16 inch long piece of flat bar copper 12 FIG. 9. This bar is connected into the slot 11 on the upper 5/16 inch rod, by a copper rivet 13 inserted through a hole 14 in the slotted end of the upper 5/16 inch rod. The rivet acts as an axis and is peaned over just enough to allow the flat bar 12 to be moved in an ark 15 and yet touching both the sides of the slot 11.

This bar 12 when aligned parallel longitudinally with the body of the switch, comes into contact and is engaged by a slot 16 in the end of another piece 21, that is a similar 5/16 inch rod that is pressed into the lower piece of copper tubing 2 and extends through the plastic 4 which holds it firmly in place.

The copper flat bar 12 has two holes 17 & 18 drilled through it on center up ¼ inch from either end. The top hole 17 is the one that a rivet 13, is placed through and this rivet acts as an axis and connects the bar 12 to the upper 5/16 inch slotted rod 10 which is connected to the body of the switch.

The lower 11/64 inch hole 18. in the flat bar 12 is available for a small diameter screw or bolt to be placed through it and acts as a turning axis for a keeper attached to one end of a wire cable, such as a choke cable. This cable can be added as a remote control to the Electrical Safety Switch. The other end of the cable can be let through the fire wall of an automobile or vehicle and attach to the underside of a dashboard or in the glove compartment etc. and thus facilitate the use of the Safety Switch, to engage or disengage it.

The choke or Safety Switch Cable is not included in the drawings as similar cables are already on the market.

A small diameter hole 19 is drilled and threaded in the bottom piece of copper tubing 2 and a small machine screw 20 is inserted and used to tighten and hold the Electrical Safety Switch firmly to the D.C. battery post. This also gives extra conductivity.

What is claimed is:

1. A battery cutoff switch comprising a tiered cylindrical insulator formed with a large diameter middle portion, and smaller diameter first and second end portions;

first and second tubes of conductive material, said first tube surrounding said insulator first end portion, and said second tube surrounding said insulator second end portion and overlapping said insulator second end portion on the side opposite said insulator middle portion, whereby said insulator middle portion insulates said first conductive tube from said second conductive tube;

said second conductive tube having battery terminal connecting means including the overlapping end thereof;

two switch posts, one electrically and mechanically connected to said first conductive tube, and the other electrically and mechanically connected to said second conductive tube;

a knife blade pivotally connected to one switch post and moveable to engage or disengage said second switch post, whereby a circuit between said first conductive tube and said second conductive tube and a battery terminal connected thereto is made or broken.

2. The battery cutoff switch of claim 1 wherein said battery terminal connection means further includes a set screw in said overlapping portion.

3. The battery cutoff switch of claim 1 wherein said first insulator end portion is of even smaller diameter than said second insulator end portion.

4. The battery cutoff switch of claim 1 wherein said insulator is a molded piece of plastic.

5. The battery cutoff switch of claim 1 wherein a pull cable is connected to the movable end of said knife blade to remotely operate said blade.

* * * * *